June 20, 1972  E. B. WESTLAKE, JR  3,671,349
APPARATUS AND METHOD OF MAKING ROUND BOTTOM PLASTIC
LINERS FOR SHIPPING CONTAINERS
Filed Aug. 22, 1969

INVENTOR.
EDWARD B. WESTLAKE, JR.
BY
McClure, Weiser & Trillman
ATTORNEYS.

United States Patent Office 3,671,349
Patented June 20, 1972

3,671,349
APPARATUS AND METHOD OF MAKING ROUND BOTTOM PLASTIC LINERS FOR SHIPPING CONTAINERS
Edward B. Westlake, Jr., 307 Lincoln Ave., Havertown, Pa. 19203
Filed Aug. 22, 1969, Ser. No. 852,418
Int. Cl. B29c 17/06
U.S. Cl. 156—229     5 Claims

ABSTRACT OF THE DISCLOSURE

A method of making a removable plastic liner for containers wherein a flexible plastic tubular section is loosely draped over a relatively narrow disc-like mandrel until a relatively short end portion thereof projects beyond the mandrel and mechanically or pneumatically expanding a relatively narrow area of the tubular section at the mandrel to cause the projecting portion to turn inwardly and form a flange to which a bottom sheet can be readily bonded, the invention making it possible to drape the tubular section over and remove it from the mandrel with relative ease.

---

This invention relates to plastic liners for large shipping containers for bulk shipment of liquid, powdered or granular materials such as chemicals, oil, paint, food products and the like. Because these plastic liners are liquid impervious, odorless and generally resistant to attack by most chemicals, they are particularly well adapted for removable insertion in an outer container of inexpensive, lightweight construction.

One method of forming such a liner is disclosed in the Winstead Pat. No. 2,748,673 wherein a tubular section of plastic film is pulled over a solid mandrel whose diameter exceeds that of the tubular section and whose length is substantially coextensive with the tubular section. The tubular section is pulled over the mandrel until a relatively short length, about 1–2 inches, remains projected beyond the end of the mandrel causing the projected short length to turn inwardly and generally overlie that end of the mandrel. A film sheet is then placed over the inturned short length or flange of the film and heat sealed thereto to form a generally round bottom that more easily conforms to the interior of a conventoinal cylindrical container thereby reducing the tendency of the film to tear adjacent the seam.

The method of the Winstead patent has several disadvantages. One is that the pulling of a tubular section of film for virtually its entire length over a wider mandrel is most difficult to effect. Another is that after this difficult operation has been accomplished and the sheet is bonded to the inturned flange to form the bottom, it is most difficult to remove the liner from the mandrel since the greater length thereof has remained in expanded and tight fitting state on the wider mandrel.

It is a primary object of this invention to provide a method for making a plastic round bottom liner which overcomes the disadvantages of the Winstead method noted above and thereby provides an efficient method of mass producing the liners.

Another object of the invention is to provide a method of forming a plastic liner wherein the tubular section is draped over a relatively short mandrel whose diameter is less than that of the tubular section until a relatively short length of the tubular section projects beyond the mandrel and pneumatic means associated with the mandrel are operated to effectively increase the diameter of the mandrel, stretch the area of tubular section contacting the pneumatic means and thereby inturning the projected short length of the section to form a flange to which a round bottom can be readily bonded. In this manner, the draping on and the removal from the mandrel can be readily effected since in both operations the pneumatic means is rendered inoperative, in which condition the diameter of the mandrel is less than that of the tubular section.

These and other objects of the invention will become more apparent as the following description proceeds in conjunction with the accompanying drawings, wherein.

Figure 1:
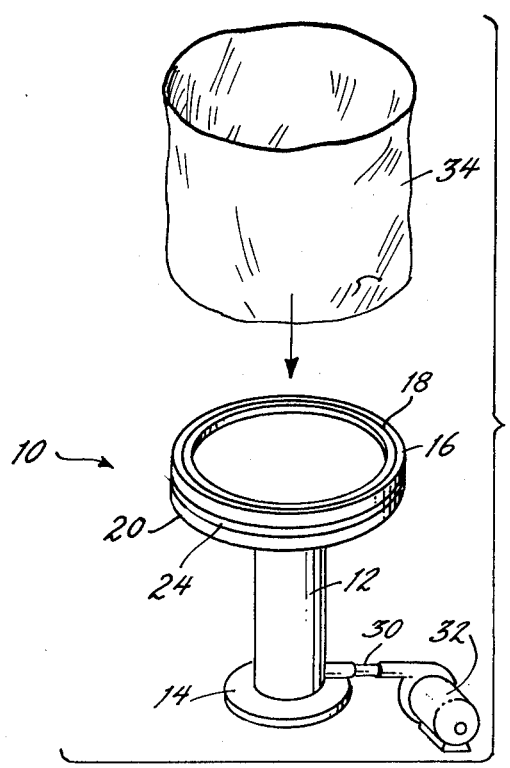
FIG. 1 is a perspective, partially diagrammatic view illustrating the first step of one form of the invention showing the tubular section of plastic film ready to be draped on the mandrel.

Specific reference is now made to the drawings in which similar reference characters are used for corresponding elements throughout. Referring to FIGS. 1–7, the apparatus is generally indicated at 10 and comprises a pedestal 12 on a suitable base 14, the pedestal supporting or carrying a cylindrical head or disc-like plate 16 serving as a mandrel. The plate is about ¾" thick and includes a peripheral recess opening through its upper face in which a silicone rubber pad 18 is press-fit or otherwise mounted for a purpose later to appear.

The peripheral edge or face 20 of the plate 16 is provided with a preferably semi-circular groove 22 opening therethrough, similar to a conventional piston ring groove and mounted therein by suitable means such as press fitting or cement is a hollow, flexible, inflatable and deflatable pneumatic, preferably rubber, tube 24. At a predetermined point, the pneumatic tube 24 connects by a suitable nipple 26 to a conduit 28 which extends through the plate 16 and the pedestal 12 and is operatively connected as at 30 to a conventional air pump 32.

The plastic liners to be made in accordance with this invention each comprise a tubular section 34 open at its opposite ends and a sheet 36 ultimately bonded thereto to form a round bottom. While the liner may be made of any thermoplastic plastic and the bottom can be secured to the tubular section by cement, the instant invention is best adapted for polyethylene using heat sealing as the bonding means. The tubular section can vary in length from about 12" to about 100" and in diameter from about 12" to about 36", as compared to the plate or mandrel 16 whose thickness (height) is only ¾" and whose diameter is about ¾" less than that of the tubular section.

Figure 2:
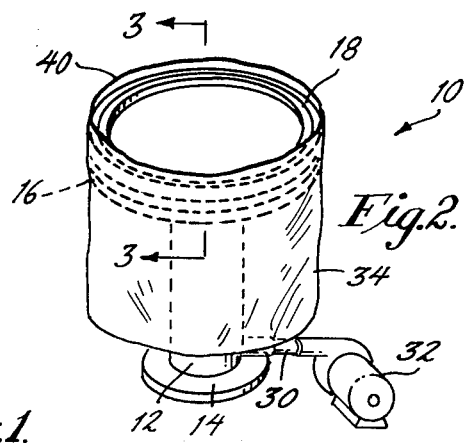
FIG. 2 is a view similar to FIG. 1 of the second step showing the tubular section in place on the mandrel.
Figure 3:
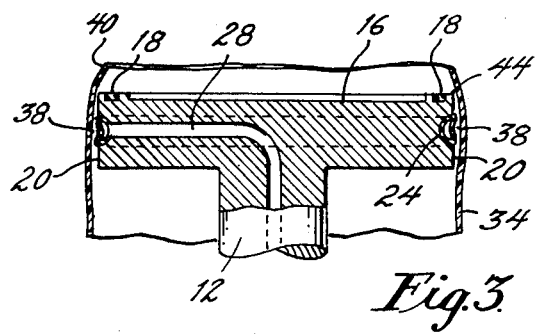
FIG. 3 is a sectional view taken on the line 3—3 of FIG. 2 showing the pneumatic means in inoperative condition and the tubular section loosely positioned on the mandrel.
Figure 4:
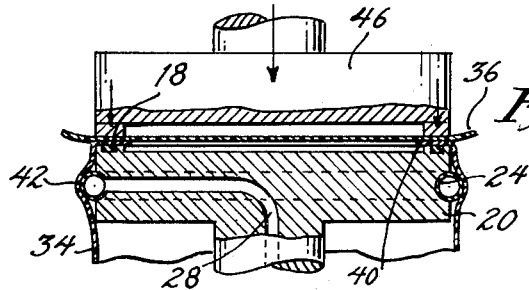
FIG. 4 is a view similar to FIG. 3 of the third step showing the pneumatic means in operation to increase the effective diameter of the mandrel and thereby expand the contacted area of the tubular section.
Figure 6:
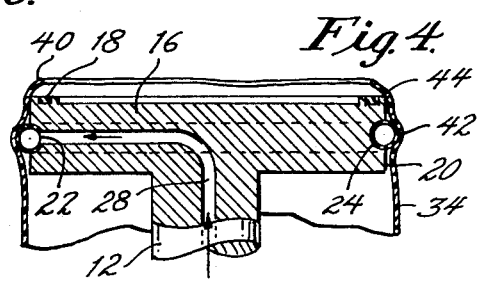
FIG. 6 is a view similar to FIG. 4 of the fourth step showing the bonding of a round sheet to the inturned flange of the tubular section to form the bottom.
Figure 5:
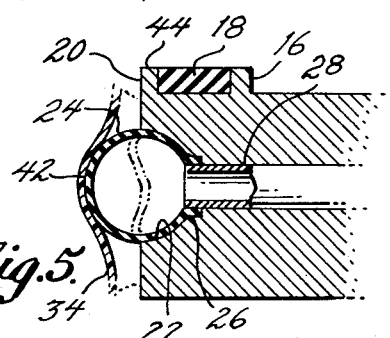
FIG. 5 is an enlarged detail of the pneumatic to be carried by the mandrel shown expanding the contacted area of the tubular section as in FIG. 4.

In use, with the pump 32 inoperative and the pneumatic tube 24 deflated as shown in FIG. 3, so that the tube does not materially extend beyond the peripheral face 20 of the plate 16, the tubular section is draped over the plate, as shown in FIGS. 1–3, which operation is easily effected since there is a substantial clearance 38 (about ¾") between the plate 16 and the inner diameter of the tubular section 38. The tubular section is moved down until only a relatively short portion 40, about 1" to 2", projects beyond the upper surface of the plate 16, at which time the pump 32 is actuated, preferably by a pedal or push-button operated switch (not shown), to deliver air under pressure to the pneumatic tube 24 and inflate the same as shown in FIGS. 4–6. In the inflated condition the diameter of the effective diameter of the plate or mandrel 16 (i.e. the diameter of the plate plus that of the expanded tube) exceeds the inner diameter of the plastic tubular section 34, whereby at the area of contact 42 of the inflated tube 24 and the tubular section 34 (which is generally about ¼" high) the latter expands outwardly causing the relaxed projected end 40 to turn inwardly around the upper edge 44 of the plate or mandrel 16 and over the pad 18. In this condition, the circular plastic sheet 36 is laid on the mandrel covering the inturned flange 40 and by means of an electrically heated press 46, the sheet 36 is sealed as at 48 to the inturned flange 40, the silicone rubber pad acting as a yieldable take-up for any possible variation in misalignment between the heat sealing press 46 and the mandrel 16.

Figure 7:
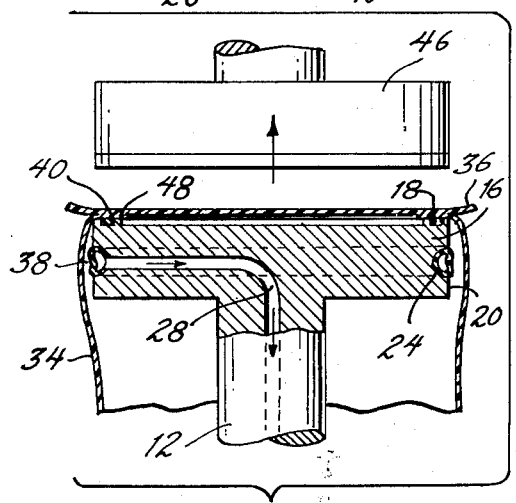
FIG. 7 is a view similar to FIG. 6 of the fourth step showing the removal of the heat sealing unit and the deflation of the pneumatic tube of the mandrel, whereby the liner is in position for removal from the apparatus.

After the press 46 is raised, as shown in FIG. 7, the pump 32 is turned off to deflate the pneumatic tube 24 to its original position to permit easy removal of the liner with sealed bottom therefrom. If desired, a valve leading to a source of vacuum (not shown) may be operatively connected in the pipe connection 30 so that synchronously with the raising of the heating press 46 or by actuation of the aforementioned foot pedal, the pump 32 will be turned off and the valve to the vacuum line will be opened to deflate the pneumatic tube 24.

While a preferred embodiment has been here shown and described, a skilled artisan may make variations without departing from the spirit of the invention. For example, the principles of the invention are applicable as well to multi-wall liners in which the tubular section is double-backed on itself and mounted on the mandrel as illustrated in the drawings. Also, while a particular cross-sectional shape of inflatable tube 24 has been shown, any other shape can be employed as well. It is to be further understood that the length and diameter of the tubular section as disclosed hereinbefore are illustrative and non-limitative.

I claim:
1. A method of making a plastic liner for a container from a flexible plastic tubular open-ended section comprised of draping the tubular section over a disc-like mandrel whose diameter is less than that of the tubular section and whose thickness is considerably less than the length of the tubular section until a relatively short portion at one end of the tubular section projects beyond the mandrel, and pneumatically increasing the effective diameter of the mandrel so that an area of the tubular section is expanded to thereby inturn its relatively short projecting portion over a portion of the mandrel; disposing a sheet of plastic over the inturned projecting portion and bonding them together by heat or cement.

2. The method of claim 1 and reducing the effective diameter of the mandrel to its original diameter after the sheet has been bonded to the inturned projecting portion, and then removing the liner from the mandrel.

3. The method of claim 1 wherein the pneumatic increase of the effective diameter of the mandrel is effected by mounting a flexible inflatable tube on said mandrel and selectively delivering air under pressure thereto to expand it so that a portion thereof extends materially beyond the peripheral edge of the mandrel.

4. In a method of making a plastic liner for a container from a flexible plastic tubular open-ended section comprised of draping the tubular section over a disc-like mandrel whose diameter is less than that of the tubular section and whose thickness is considerably less than the length of the tubular section until a relatively short portion at one end of the tubular section projects beyond the mandrel, and pneumatically increasing the effective diameter of the mandrel so that an area of the tubular section is expanded to thereby inturn its relatively short projecting portion over a portion of the mandrel, said inturned projecting portion of the tubular section being thus in a position to have a further sheet bonded thereto by heat or cement.

5. The method of claim 4 wherein the pneumatic increase of the effective diameter of the mandrel is effected by mounting a flexible inflatable tube on said mandrel and selectively delivering air under pressure thereto to expand it so that a portion thereof extends materially beyond the peripheral edge of the mandrel.

References Cited

UNITED STATES PATENTS

| | | | |
|---|---|---|---|
| 2,745,778 | 5/1956 | Garten | 156—287 |
| 2,748,673 | 6/1956 | Winstead | 220—63 X |
| 2,869,329 | 1/1959 | Jourdain | 279—2 |
| 3,228,678 | 1/1966 | Koger | 156—287 X |
| 3,244,379 | 4/1966 | Bauer | 279—2 X |
| 2,750,629 | 6/1956 | Baudou | 18—45 R |

FOREIGN PATENTS

| | | | |
|---|---|---|---|
| 1,124,671 | 9/1956 | Germany | 156—287 |

CARL D. QUARFORTH, Primary Examiner

E. E. LEHMANN, Assistant Examiner

U.S. Cl. X.R.

18—DIG 14; 25—128 D; 156—287; 220—66; 249—65